W. G. KINTON.
VOLTAGE REGULATOR.
APPLICATION FILED JUNE 24, 1908.
1,101,938.
Patented June 30, 1914.
3 SHEETS—SHEET 1.
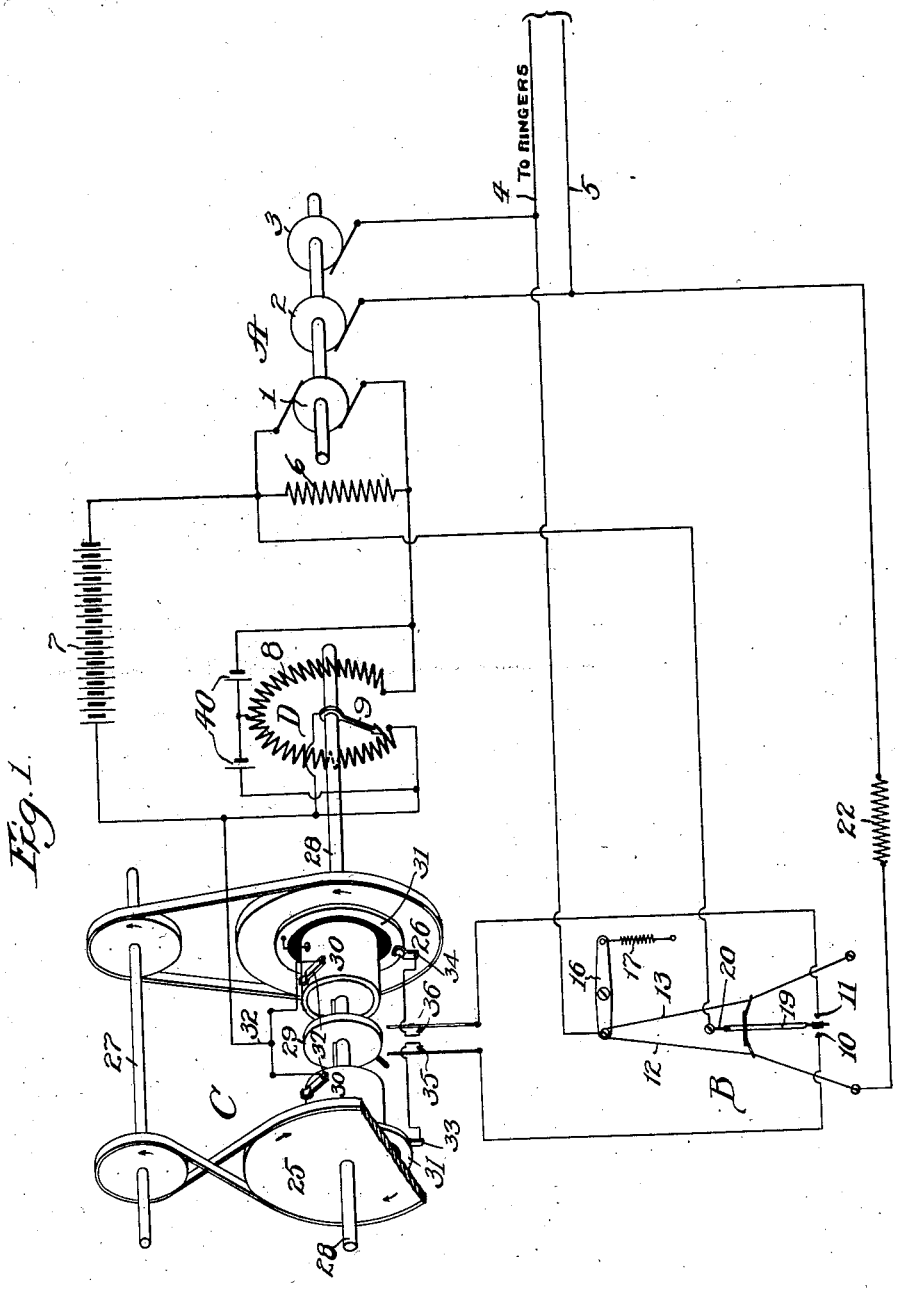
Witnesses:
Irving MacDonald
McClelland Young
Inventor:
William G. Kinton
By Barton, Panner & Folk,
Attys.

W. G. KINTON.
VOLTAGE REGULATOR.
APPLICATION FILED JUNE 24, 1908.
1,101,938.
Patented June 30, 1914.
3 SHEETS—SHEET 2.
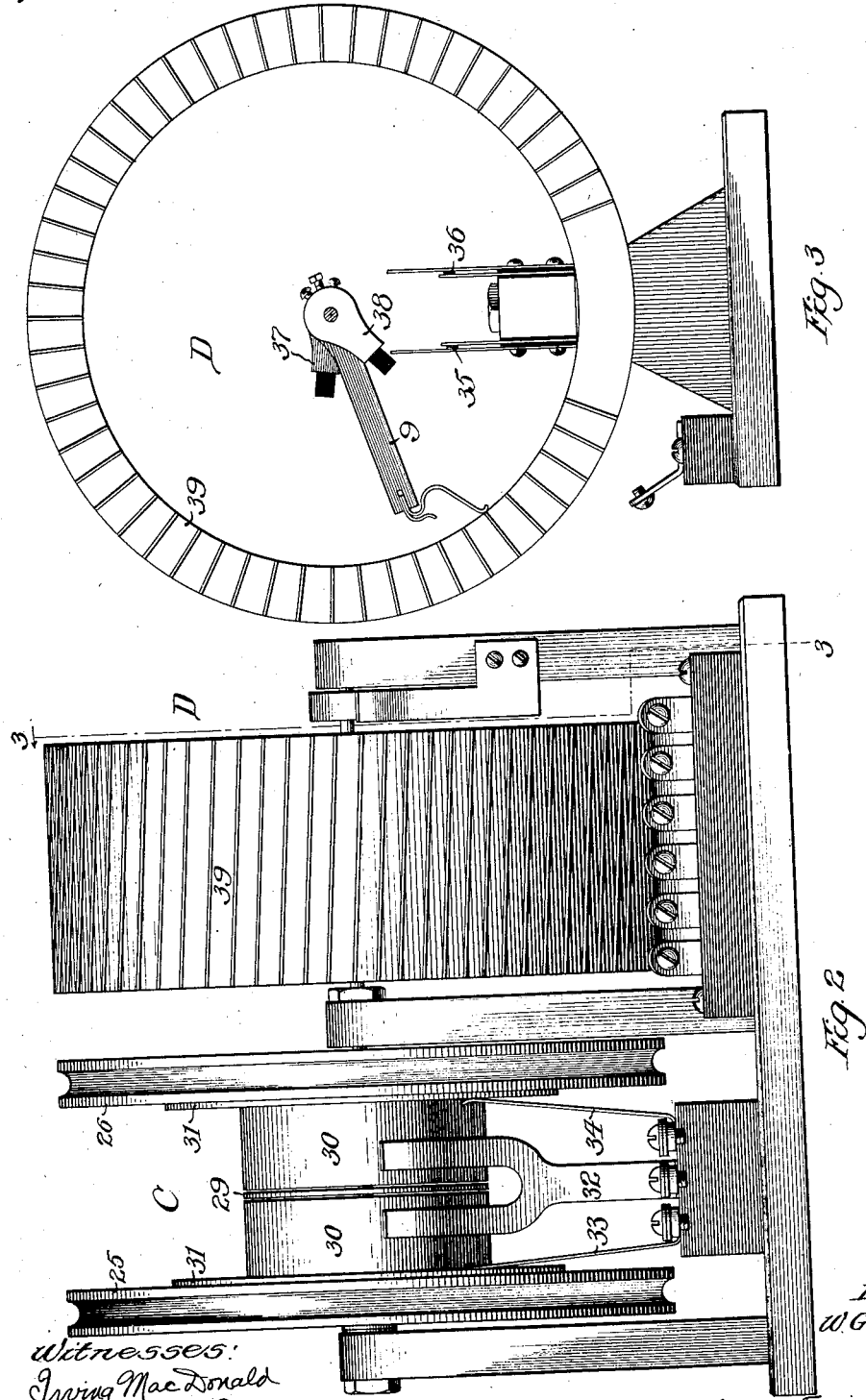

W. G. KINTON.
VOLTAGE REGULATOR.
APPLICATION FILED JUNE 24, 1908.
1,101,938.
Patented June 30, 1914.
3 SHEETS—SHEET 3.
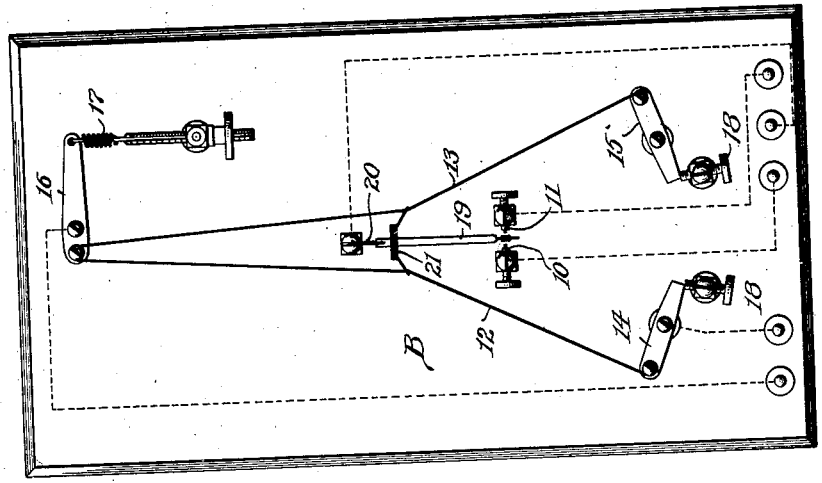
Witnesses:
Irving MacDonald
McClelland Young
Inventor:
William G. Kinton,
By Barton, Panner & Folk,
Attys.

UNITED STATES PATENT OFFICE.

WILLIAM G. KINTON, OF CHICAGO, ILLINOIS, ASSIGNOR TO WESTERN ELECTRIC COMPANY, OF CHICAGO, ILLINOIS, A CORPORATION OF ILLINOIS.

VOLTAGE-REGULATOR.

1,101,938.  Specification of Letters Patent. Patented June 30, 1914.

Application filed June 24, 1908. Serial No. 440,099.

*To all whom it may concern:*

Be it known that I, WILLIAM G. KINTON, citizen of the United States, residing at Chicago, in the county of Cook and State of Illinois, have invented a certain new and useful Improvement in Voltage-Regulators, of which the following is a full, clear, concise, and exact description.

This invention relates to voltage regulators for dynamo-electric machines, and its object is to provide means by which the voltage of the machine may be kept nearly constant under all conditions of service.

It is customary in telephone exchanges to provide a source of current for ringing the bells at the subscribers' stations. This source may be an alternating current generator driven by a direct current motor, or it may be a dynamotor or motor-generator. The field and armature of the motor may be supplied with current from a storage battery or other source of direct current. The battery leads to the motor may have included in them an adjustable rheostat for regulating the flow of current to the motor and thereby the voltage of the generator.

The invention relates more particularly to the automatic regulation of the dynamo or generator voltage in such a system, and to this end it comprises two instrumentalities, one relatively sluggish and adapted to adjust the rheostat so as to supply current of greater or less voltage to the motor upon variation in load of the external circuit of the generator, this regulation being under the direct control of the voltage condition of the generator leads; the other instrumentality coöperates with the rheostat adjusting means in such a manner that sudden changes in the load on the generator will not result in a sudden increase or decrease in the voltage of the motor circuit. In other words, the voltage at the terminals of the motor will by this feature of the invention be maintained almost constant, notwithstanding the presence of resistance in the battery leads, during the brief interval following a sudden change in load on the generator and preceding the response of the more sluggish rheostat adjusting device.

The device which is preferred and which is shown herein for taking care of sudden changes in load on the generator consists of a counter-electromotive force cell or cells shunted about the resistance coils of the adjustable rheostat. Such cells connected in this manner become charged, during a quiet or unvarying condition of load on the generator, to a voltage equal to the drop in potential in the resistance about which they are shunted. Their current charge and their voltage are subject to changes with changes in current through the resistance, but they have large capacity for supplying or absorbing current during brief periods following abrupt changes in load demanded by the circuit in which they are included. Thus in the system of this invention, sudden changes in load in the generator, either increase or decrease, are followed instantly by a supply or absorption of energy by the electrolytic cells. As a convenient and efficient device for adjusting the resistance-varying rheostat, a hot wire relay is used together with an electromagnetic clutch driving mechanism, which, although capable of rather quick response to changes in voltage, are not so quick in their action as the electrolytic cells which may be depended upon to act instantly.

The invention may be more readily understood by reference to the accompanying drawings in which—

Figure 1 is a diagram of circuits and apparatus embodying the invention; Fig. 2 is a side elevation of the rheostat and the clutch mechanism which may be employed for controlling its operation; Fig. 3 is an end view of the rheostat, the end support therefor being omitted for sake of clearness; Fig. 4 is a central horizontal section through the mechanism shown in Fig. 2; and Fig. 5 is a plan view of a floating or hot-wire relay for controlling the operation of the clutch mechanism.

Like parts are indicated by the same reference characters throughout the different views.

Referring to Fig. 1, A represents a dynamotor such as is used for supplying ringing currents for telephone systems. This dynamotor is of the usual construction, and in the diagram 1 designates the motor element and 2, 3 the generator slip rings from which current is supplied to the mains 4, 5, leading to the ringers. The field winding 6 and the armature of the motor are supplied with current from a battery 7, which may be a storage battery or other suitable source of current. This winding may be such that the field is nearly saturated, and therefore the flux through the armature would be nearly constant, in which case the voltage and frequency of the current delivered by the generator winding would vary with the resistance in the battery supply leads; or this field may be so unsaturated as to give the motor a practically constant speed, in which case the frequency would be practically constant and the voltage would vary with the field. A rheostat D is included in one of the battery leads. It comprises a resistance 8. The number of coils of this resistance which are included in the circuit may be varied by adjusting the position of the rheostat arm 9. The movement of the arm 9 is controlled by an electromagnetic clutch mechanism C which in turn is controlled by the hot wire relay B, and this relay in turn is controlled and responds to variations in voltage at the generator leads 4, 5.

The floating or hot-wire relay B is shown in detail in Fig. 5, and the circuits in which it is included are indicated in Fig. 1. Its function is to open or close the contacts 10, 11 in accordance with the voltage of the alternating current delivered by the dynamotor A. The relay comprises two wires 12, 13, preferably of the same diameter, material and length. The lower ends of these wires 12, 13 are connected to levers 14, 15, respectively, pivoted on a suitable mounting plate. The upper ends of these wires are connected to a common lever 16 similarly pivoted. This lever is held under tension by an adjustable spring 17. The tension upon each wire 12, 13 may also be independently regulated by means of the adjusting screws 18, which bear against the ends of the levers 14, 15.

The contact-arm 19 is mounted on a flat flexible spring 20 which in turn is mounted upon the supporting base. This arm 19 lies between the wires 12, 13 and carries a block of insulating material 21, the opposite ends of which are connected to said wires intermediate the ends thereof. By this means the wires 12, 13 are so adjusted as to tension that the free end of contact arm 19 when the motor is at rest presses against contact 10. Under the normal condition of operation, however, current being supplied from the leads 4, 5 through the wire 12, the contact arm 19 takes a position midway between and without touching either of the contacts 10 or 11. If for any reason, such as variation of room temperature, the temperature of both wires 12, 13 changes the same amount, thus producing an equal change in the length of both wires, the only effect will be to change the pull on the spring 17, the contact arm 19 remaining in its midway position. If, however, the voltage in the leads 4, 5 rises above normal, the wire 12 becomes abnormally heated and the wire 13 pulls the arm 19 against contact 11. On the other hand, if the voltage in the leads 4, 5 falls below normal, the wire 12 is cooled below its normal operating temperature and pulls the arm 19 against contact 10.

Referring again to Fig. 1, it will be noted that the wire 12 is connected to the dynamotor leads 4, 5 through a suitable resistance 22. If, for any reason, the voltage of the current furnished to the mains 4, 5 rises or falls, the resulting increase or decrease of current flowing through the wire 12 will cause a corresponding lengthening or shortening of that wire, and thus a movement of the contact arm 19 to the contact point 11 or 10. The movement of the arm 19 depends on the difference in length of the two wires 12, 13 and not on their absolute lengths, and hence the same change in current flow through the wire 12 will produce the same deflection of the contact arm 19 regardless of the temperature of the room in which the apparatus is located. The regulating wire 12 of the relay B should be small so that the wire will heat or cool off rapidly, as the case may be, in response to changes in voltage. I have found that a .003" wire will give satisfactory results.

As before stated, the function of the hot wire relay B is to control the electromagnetically-operated mechanism for rotating the rheostat arm 9. Any suitable mechanism of this kind may be employed, as for example a double acting ratchet and wheel and two relays, one to operate the ratchet in one direction, and the other in the opposite direction, such as is shown for example in United States Patent to Edison, No. 287,511 of October 30th, 1883. In the drawings is shown an alternative scheme comprising an electromagnetic clutch mechanism C.

The clutch mechanism C comprises two electromagnets 23, 24 affixed to the pulleys 25, 26, respectively. These pulleys are constantly rotated in opposite directions by means of belts and a constantly rotating shaft 27. The electromagnets 23, 24 and pulleys 25, 26 are loosely mounted on a shaft 28 which carries the rheostat arm 9. A magnetic disk 29 is fixed upon the shaft 28 between the electromagnets 23, 24 so as to have a longitudinal movement with respect to the shaft.

Each of the magnets 23, 24 is inclosed in an iron cylinder 30, and one end of each magnet winding is connected to its cylinder, the other terminal of the winding being connected to a metallic ring 31 carried on the pulley to which the magnet is affixed. The magnets 23, 24 may be fed by the battery 7 through forked brush 32 bearing on the cylinders 30, and brushes 33, 34 bearing upon the two contact metallic rings 31. The leads from the brushes 33, 34 are normally closed through contacts 35 and 36, respectively, to the contacts 10 and 11 of the hot wire relay B, but the rotation of the shaft 28 in position to cut in or out all of the resistance 8 will bring an arm 37 or an arm 38, as the case may be, into position to engage the springs of contacts 35 or 36 to open said contacts and thus to open the circuit through that one of the magnetic clutches which had operated to bring the arm to such position. Upon the operation of the relay B to close contact 10, current will flow from battery 7 through the arm 19, contacts 10 and 35, brush 33, metallic ring 31 the windings of the electromagnet 23, brush 32 to the opposite pole of battery 7. The magnet 23, being thus energized, will attract the disk 29, thereby bringing the shaft 28 into clutched engagement with the rotating pulley 25, whereupon the arm 9 will be moved in a clockwise direction to gradually cut out some of the resistance 8. In case the shaft 28 is rotated sufficiently to cut out all of the resistance, further rotation in the same direction will cause the arm 37 to open the circuit of the electromagnet 23 at the contact 35, thus deënergizing the magnet 23 and releasing the clutch, thus stopping the rotation of the shaft 28. The rotation of the shaft 28 in the opposite direction to cut in more of the resistance 8 is brought about in a similar manner upon the closure of contact 11 by the energization of the electromagnet 24.

The speed at which the arm 9 may be moved to vary the resistance 8 is dependent upon the capacity of the machine to adjust itself to the changed conditions, that is to say, to the changing voltage in the generator leads. If the resistance be changed too rapidly, the machine will lag behind, and, after the clutch mechanism stops, will build up above or drop below the required voltage. The farther apart the limits of the required voltage are, the faster the resistance may be varied. With limits of 80 to 90 volts in the ringing current, I have found that the resistance 8 could be varied in one second so as to compensate for the full load being thrown on at once, when the battery 7 was at 28 volts. By arranging the magnetic clutch so that it releases quickly, the clutch mechanism can be made to run at a speed of from one to two revolutions per second, when such rapid rate of cutting out resistance is desirable. The resistance 8 is wound on a hollow core 39 of wood or other insulating material, and the rheostat arm 9 makes sliding contact on the inside of this core.

In shunt of the resistance 8, or in shunt of segments thereof, are provided counter-electromotive force or electrolytic cells 40, the function of which is to prevent any appreciable change in the electromotive force impressed upon the machine when the ringing load changes suddenly. In short, these cells 40 tend to keep the voltage drop across the resistance 8 constant by supplying or absorbing energy following sudden changes in load. If the cells 40 were not in shunt of the resistance 8, the drop in voltage through that resistance would always be proportional to the current in the battery lead, and hence a sudden change in load would suddenly change this drop. With the cells 40 in shunt about the resistance, however, the drop will not be more than the potential of these cells, and as they remain nearly constant for brief periods regardless of current, sudden changes in load will cause only a gradual change in the drop of potential across the resistance 8. Thus the cells 40 serve to maintain a nearly constant voltage to the motor of the dynamotor upon sudden changes in load on the generator during the brief interval preceding the operation of the more sluggish hot wire relay B. Current flows through the counter-electromotive force cells momentarily following these sudden changes, and these currents are of short duration but of sufficient duration to take care of the sudden changes in load. Following such sudden changes the cells will gradually pick up and assume a potential equal to the drop in voltage across the resistance 8 about which they are shunted.

The counter-electromotive force cells 40 may consist of ordinary glass jars with a brine electrolyte and iron and aluminum electrodes. Although a plurality of cells 40, each shunting a portion of the resistance 8 are shown, it is not essential that this particular arrangement or division of the resistance into sections be used. The two cells may be joined in series, in one shunt circuit of the whole resistance, or three or more cells may be connected, either in this manner or so that each will shunt a definite portion of the whole resistance. The important requirement is that the whole or major part at least of the resistance in the circuit shall be shunted by one or more counter-electromotive cells of such capacity that they will act to supply or absorb energy momentarily in sufficient quantities to take care of the short intervals of time following sudden changes in load on the generator and preceding the consequent readjustment of the rheostat.

When the ringing voltage has risen sufficiently and for a sufficient time to operate the relay B, such change in voltage is taken care of by said relay which thereupon operates to adjust the variable resistance 8 so as to maintain the required ringing voltage. The relay B is moreover quite sensitive to changes in voltage in the ringing current. When adjusted to a given strength of current it will float between the contacts 10 and 11 and will close one or the other of said contacts upon even a very small variation of the current strength.

I claim:—

1. In apparatus of the described character, the combination with a dynamo of a circuit therefor, including a source of current, an adjustable sectional resistance in said circuit, fixed contacts for said resistance sections, a moving contact therefor, and counter electromotive force cells included in a shunt around the sections of said resistance.

2. In an apparatus of the described character, the combination with a dynamo electric machine and a circuit therefor including a source of current, of an adjustable sectional resistance in said circuit, means for automatically varying said resistance, a shunt circuit around sections of said resistance and means in said shunt for regulating the drop in electro-motive force across the sections of said resistance.

3. In apparatus of the described character, the combination with a dynamotor, of a motor circuit therefor including a source of current and a variable resistance, a dynamo circuit means responsive to variations in voltage in said dynamo circuit for varying said resistance, a shunt around said resistance, and means in said shunt for regulating the drop in voltage between the terminals of said resistance.

4. In an apparatus of the described character, the combination with a dynamotor, of a motor circuit therefor including a source of current, a variable resistance in said circuit, a dynamo circuit means responsive to variations in voltage in said dynamo circuit for varying said resistance, a shunt around said resistance, and counter electromotive force cells in said shunt for regulating the drop in voltage across said resistance.

5. The combination with a dynamotor, motor and dynamo circuits therefor, and a source of current in said motor circuit, of an adjustable resistance in the motor circuit, means responsive to variations in voltage in the dynamo circuit for varying said resistance, a shunt around said resistance and means in said shunt for preventing sudden changes in voltage between the terminals of said resistance.

In witness whereof, I hereunto subscribe my name this fourth day of June A. D., 1908.

WILLIAM G. KINTON.

Witnessess:
R. T. ALLOWAY,
RALPH G. JOHANSEN.